Nov. 1, 1938. N. J. SCHLACHTER 2,135,115
CURRENT MOTOR
Filed Sept. 29, 1936
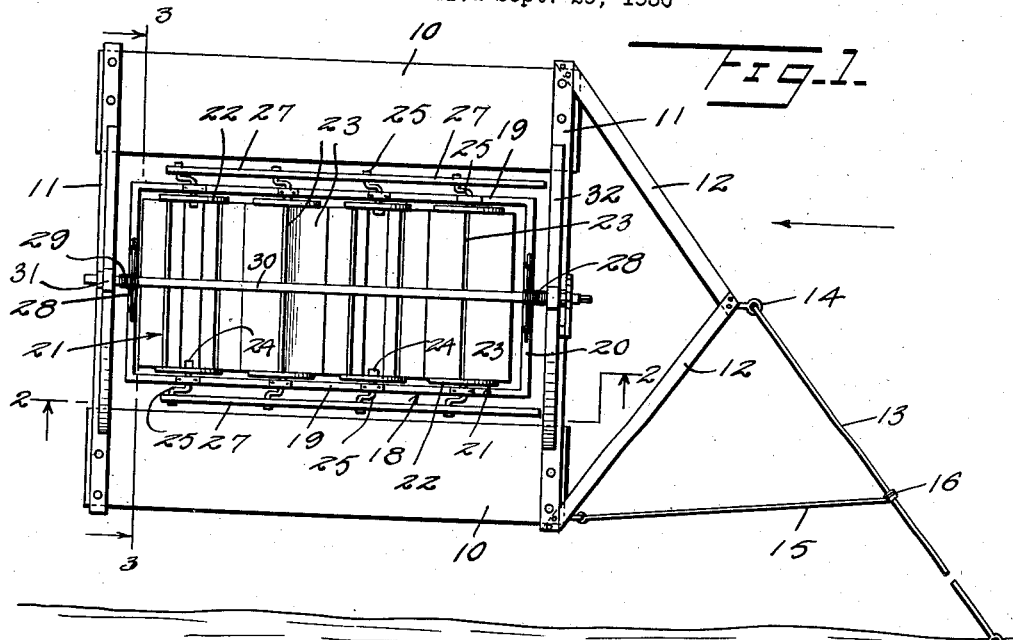
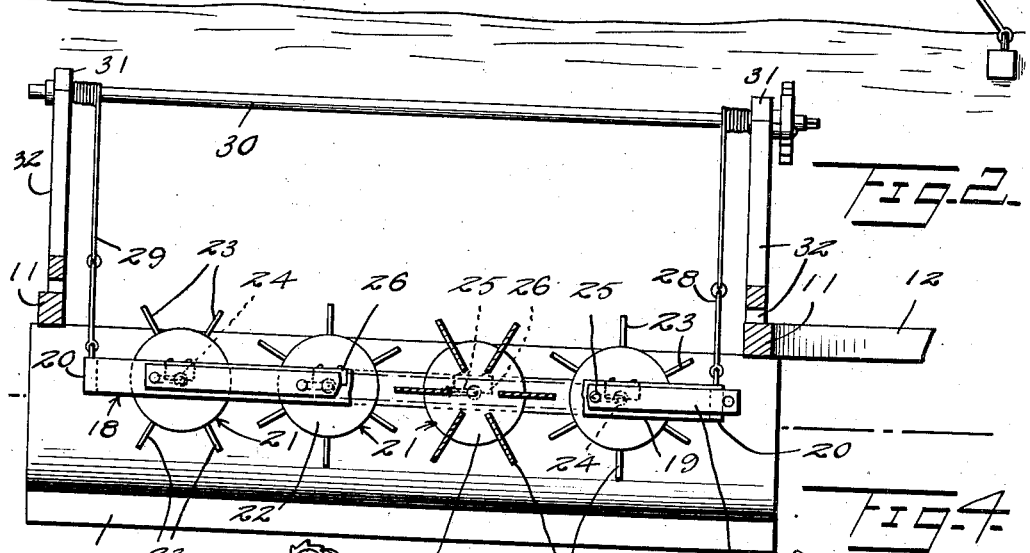
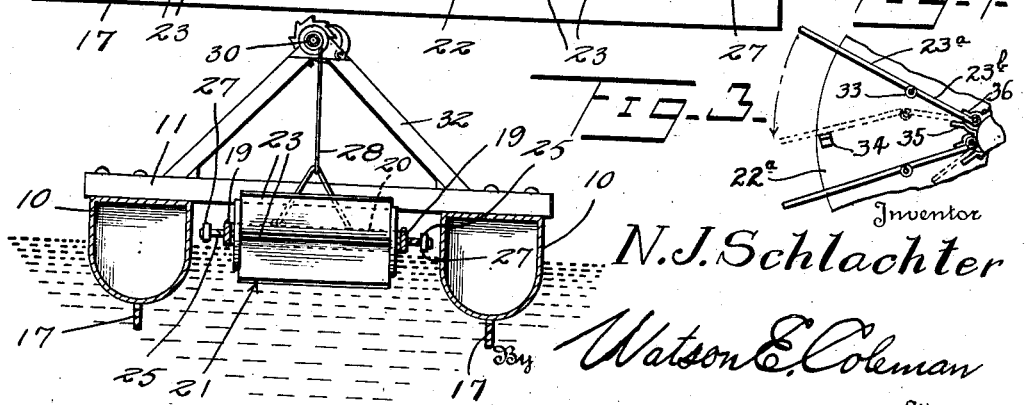
Inventor
N. J. Schlachter
By Watson E. Coleman
Attorney Patented Nov. 1, 1938

2,135,115

UNITED STATES PATENT OFFICE 2,135,115

CURRENT MOTOR

Nicholas J. Schlachter, Gettysburg, S. Dak.

Application September 29, 1936, Serial No. 103,187

1 Claim. (Cl. 170—107)

This invention relates to fluid motors and more particularly to a motor or power member which is adapted to be positioned in a moving stream of water.

An object of this invention is to provide a machine or motor of this kind which can be positioned in a moving stream of water in such a manner that the position of the motor in the stream may be varied at will so that the device will readily perform its functions notwithstanding any shifting of the bed of the water and notwithstanding any rise or fall of the water.

Another object of this invention is to provide in a current motor, means for supporting the motor relative to the water so that, when desired, the motor may be quickly removed from or replaced in the water, thus making it possible to position the motor or machine at a point outwardly from the shore line of the moving body of water and making it possible to quickly remove the machine from the water so as to prevent damage to the machine, as during the movement of ice in the water or during flood conditions.

A further object of this invention is to provide in a motor of this kind means for holding the motor in a position for engagement with the moving body of water so that the motor will not change its position relative to the movement of the water.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a top plan view of a current motor constructed according to an embodiment of this invention.

Figure 2 is a sectional view partly in detail taken on the line 2—2 of Figure 1.

Figure 3 is a sectional view taken on the line 3—3 of Figure 1.

Figure 4 is a fragmentary end elevation of a modified form of paddle wheel with one of the end plates removed.

Referring to the drawing, the numeral 10 designates generally a pair of pontoons or like buoyant members which are disposed in parallel spaced apart relation and held in such relation by means of connecting bars 11, which connect the opposite ends of the pontoons 10 together.

A pair of forwardly extending braces or draw bars 12 are secured to the forward ends of the pontoons 10 and a hawser 13 is connected at one end, as at 14, to the convergent forward ends of the braces 12 and the opposite end of the hawser 13 is adapted to be connected to a suitable point, such as a post, tree or the like along the shore of a moving stream of water.

A guide line 15 is connected at one end to one of the pontoons 10 and the other end of the guide line 15 is connected, as at 16, to the hawser or holding member 13, so that the two pontoons 10 will be maintained in a position longitudinally of the movement of the stream of water. Each pontoon 10 is provided with a keel 17 at the bottom thereof so as to prevent lateral swinging movement of these pontoons in the water.

A motor frame, generally designated as 18, is disposed between the two pontoons 10 and between the end connecting bars 11. This frame 18 comprises side bars 19 and end bars 20 forming a substantially rectangular frame slightly smaller in size than the distance between the two pontoons and the distance between the end connecting members 11. The frame 18 has a plurality of paddle wheels 21 journalled therein, the paddle wheels 21 comprising end plates 22, having a plurality of radially arranged paddles or blades 23, secured therebetween. Each end member 22 is provided with a plate 24 to which one end of a crank 25 is secured and this crank 25 has the upper or horizontal portion thereof disposed through a bearing 26 carried by the side frame members 19. Preferably, the paddle wheels 21 are so arranged relative to each other that the blades thereof will overlap a slight distance so that a number of these wheels 21 may be disposed within the motor frame 18. The offset portions of the cranks 25 are connected together as by an elongated pitman 27 and this pitman 27 is adapted to be connected through a suitable connecting means to a driving shaft.

There are two of these pitmans 27, one on each side of the frame 18, so that in the rotation of the wheels 21 there will not be any tendency for these wheels to twist by reason of the strain placed on one end thereof.

The frame 18 with the paddle wheels 21 mounted therein is supported between the pontoons 10 by means of flexible supporting members 28 and 29. These flexible members 28 and 29 are ropes or cables provided with a V-shaped portion, secured to the ends 20 of the frame 18, and the ropes or flexible members 28 and 29 are then wound about a winding shaft 30 which is journalled, as at 31, in upwardly converging bracing or supporting members 32. The supporting members 32 are secured at their divergent lower ends to the pontoons 10 or to the end braces 11 and, if desired, a suitable pawl and ratchet may be associated with the shaft 30 so that when the shaft 30 is turned to wind the ropes 28 and 29 thereabout in order to raise the motor frame 18, the frame 18 may be conveniently held in its raised or inoperative position. These ropes 28 and 29 may also be used to determine the depth of the blades 23 in the moving stream of water.

In the use and operation of this motor, the pitman 27 is adapted to be connected, as by a suitable connecting link, to a crank associated with a driven shaft and which may be connected to a member to be operated by the fluid or current motor. The pontoons 10 are held in the desired position in the moving stream of water by means of the hawser or holding line 13 and the correct position of the pontoons is maintained through the connecting member 15 which will prevent any lateral swinging movement of the pontoons relative to the hawser 13. The shaft 30 may be rotated in the direction to unwind the supporting ropes 28 and 29 so that the motor frame 18 will support the power wheels 21 within the desired depth of water. It will be apparent from the foregoing that the wheels 21 may be operated in any desired depth of water which is sufficient to float the pontoons 10.

This motor may be operated substantially throughout the year in a sufficiently fast moving stream of water which will not freeze over and during the spring when the ice breaks up the entire device may be readily pulled out of the water so that the blocks of ice will not injure the machine and, at this time, the motor frame 18 may be pulled up by means of the ropes 28 and 29. The number of paddle wheels which may be used with this device is limited only by the length of the motor frame 18 which may be lengthened or shortened to the desired degree depending upon the amount of power which it is desired to obtain from this motor.

In Figure 4 there is shown a modified form of this invention where the blades are formed of two parts 23a and 23b. The part 23a is hingedly secured, as at 33, to the inner part 23b, and this inner part 23b is hingedly secured between the end plates 22a. An abutment or stop 34 is secured to the inside of the end member 22a so as to limit the swinging movement of the outer blade member 23a and the movement of the inner part 23b is limited by a stop member 35. Movement of the inner blade member 23b in the opposite or operative position is limited by a stop 36. With the use of this construction the rotation of the paddle wheels is not effected by wind as the blades are partially collapsed after they emerge from the water and then returned to an operative position on the forward side of the motor.

By referring especially to Fig. 2, it will be seen that in the normal position of the paddle-wheel supporting framework 18, the cables 28 and 29 have their lower branched ends extending down to a horizontal plane below the laterally extending pontoon-connecting bars 11, whereby the framework 18 is freely supported in such a manner that if swung forward or backward by any swiftly increasing and diminishing current, the framework itself will not be liable to be injured as the branched lower ends of the cables will engage with the framework bars or beams 11 and act as buffers.

It is, of course, understood that various changes and modifications may be made in the details of construction and design of the above specifically described embodiment of this invention without departing from the spirit thereof, such changes and modifications being restricted only by the scope of the following claim.

I claim:—

A current motor comprising a pair of laterally spaced pontoons, front and rear transversely extending bars connecting said pontoons in spaced relation to each other, upwardly converging supporting members mounted upon said transverse bars, a single longitudinally extending shaft journaled in said supporting members at the upper ends of the latter, cables adapted to be wound upon said shaft at the front and rear ends of the latter and adapted to extend downwardly therefrom to and below the horizontal plane of said transverse bars and provided at their lower ends with branches, a framework connected to the branched lower ends of said cables and freely suspended thereby between the pontoons and in operative position below the transverse bars, and power transmitting paddle-wheels journaled in said framework.

NICHOLAS J. SCHLACHTER.